United States Patent

[11] 3,611,185

| [72] | Inventor | C. Gilbert Young<br>Southwood Road, Storrs, Conn. 06268 |
|---|---|---|
| [21] | Appl. No. | 815,061 |
| [22] | Filed | Apr. 10, 1969 |
| [45] | Patented | Oct. 5, 1971 |

[54] UNITARY LASER SYSTEM WITH OVAL-SHAPED ROD OF LASER GLASS
14 Claims, 3 Drawing Figs.

[52] U.S. Cl. ........................................... 331/94.5
[51] Int. Cl. ........................................ H01s 3/06, H01s 3/09, H01s 3/02
[50] Field of Search ............................ 331/94.5

[56] References Cited
UNITED STATES PATENTS
3,308,394   3/1967   Snitzer et al. .................. 331/94.5
3,356,966  12/1967   Miller ............................. 331/94.5
3,500,230   3/1970   Kafalas ........................... 331/94.5

*Primary Examiner*—Ronald L. Wibert
*Assistant Examiner*—R. J. Webster
*Attorneys*—Lane, Aitken, Dunner & Ziems and William C. Nealon ABSTRACT: This specification discloses a glass laser system comprising a rod of laser glass with two flashlamps one on each side of the rod. The flash lamps and the rod are combined in a unitary construction. The rod is oval in cross section to increase the length of the path of the pump light from the flashlamps through the rod.

PATENTED OCT 5 1971　　　　　　　　　　　　　　　3,611,185

INVENTOR
C. GILBERT YOUNG

BY Lane, Aitken, Dunner & Ziems
and William C. Nealon
ATTORNEYS

UNITARY LASER SYSTEM WITH OVAL-SHAPED ROD OF LASER GLASS

BACKGROUND OF THE INVENTION

This invention relates to glass laser and, more particularly, to a unitary glass laser system in which two flashlamps for pumping the laser glass are mounted in a common matrix with the glass laser rod.

Laser glass is excited to a state in which it will amplify light by irradiating the rod with light produced by inert gas flashlamps. This process of exciting the laser rod is called "pumping" and the light for exciting the laser rod is called "pump light." In one construction of the prior art, the flashlamps are mounted in a common matrix with the glass laser rod on opposite sides of the rod to provide a unitary construction. In this construction, much of the pump light from each of the flashlamps passes all the way through the laser rod without exciting the rod and is lost in the flash lamp and reflector on the opposite side of the rod. The present invention provides an improved construction which increases the amount of pump light that excites the laser glass of the rod by increasing the length of the path of the pump light through the laser glass.

SUMMARY OF THE INVENTION

In accordance with the present invention, the laser rod is mounted in a common glass matrix with two flashlamps as in the above-described system of the prior art. However, in the system of the present invention the rod is oval in cross section rather than circular with the longer dimension of the oval cross section extending between the flashlamps. As a result, the path of the pump light through the laser rod will be greater and more of the pump light will excite the laser glass of the rod. In the preferred embodiment of the invention, the ends of the rod are cut at Brewster's angle to minimize reflection from these faces and to refract the beam into a circular configuration upon passing out of the rod through the end faces.

Accordingly, an object of the present invention is to provide an improved glass laser system.

Another object of the present invention is to increase the amount of pump light which excites the laser glass in a glass laser system.

A further object of the present invention is to provide an improved glass laser system of the type in which a glass laser rod and flash lamps for pumping the rod are mounted in a common matrix to provide a unitary construction.

A still further object of the present invention is to provide a glass laser rod system in a unitary construction in which the amount of pump light which excites the laser glass is maximized.

Further objects and advantages of the present invention will become readily apparent as the following detailed description of the invention unfolds and when taken in conjunction with the drawings.

DESCRIPTION OF THE PREFERRED EMBODIMENT

Figure 1:
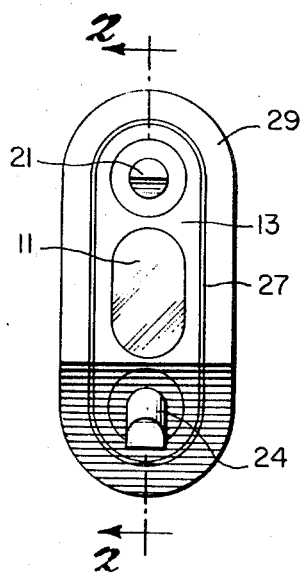
FIG. 1 is a view in elevation of one end of a unitary construction incorporating a glass laser rod and flashlamps in accordance with the present invention.
Figure 2:
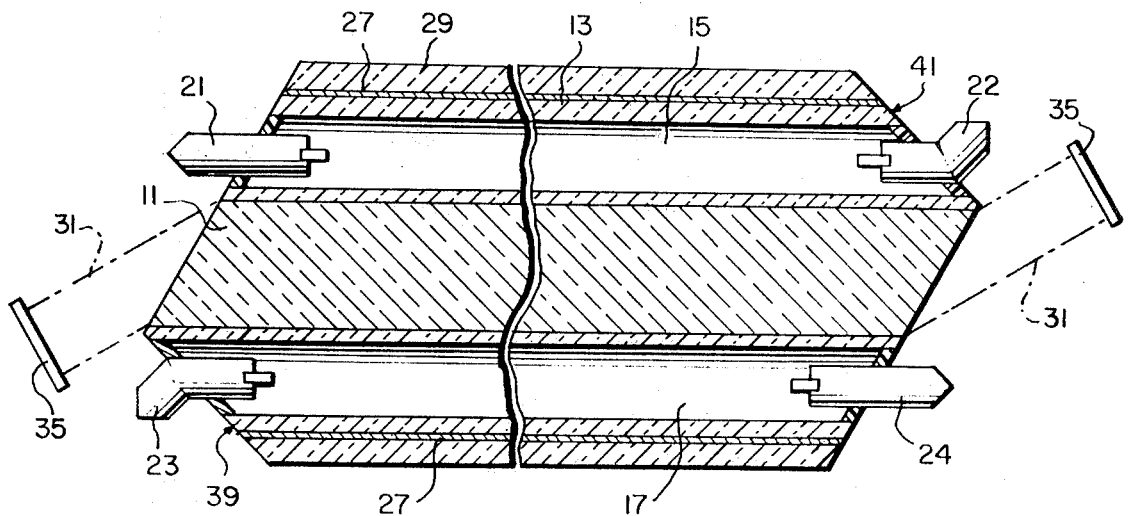
FIG. 2 is a sectional view with the middle portion broken away taken along the lines 2—2 in FIG. 1 illustrated in combination with mirrors to define the laser cavity of the system of the present invention; and, FIG. 3 is an enlarged view of the glass matrix of the laser system of the present invention illustrating how the matrix is manufactured.

As shown in FIGS. 1 and 2, the laser system of the present invention comprises a rod 11 which is surrounded throughout its length by a glass matrix 13 in which the rod 11 is mounted. The rod 11 is made of laser glass and may, for example, be glass doped with neodymium. The matrix 13 is oval in cross section as is illustrated in the end view shown in FIG. 1, and the rod 11 is positioned in the middle of the matrix. On each side of the rod 11 formed in the matrix 13 are two inert gas flashlamps 15 and 17 which extend parallel to the rod 11 substantially the entire length of the rod 11. The flashlamps 15 and 17 comprise cylindrical bores in the matrix 13 closed at each end and filled with an inert gas such as krypton. Electrodes 21 and 22 are positioned at opposite ends of the flashlamp 15 and electrodes 23 and 24 are provided at opposite ends of the flash lamp 17 for passing electrical discharge through the inert gas of the flash lamps to energize the flashlamps. As best shown in FIG. 1, the rod 11 is oval in cross section with its longer dimension running between the flash lamps 15 and 17. The outer surfaces of both the rod 11 and the matrix 13 may be described as cylindrical, by which is meant a surface defined by a straight line moving parallel to a fixed straight line. The outer cylindrical surface of the oval matrix 13 is covered with a coating 27 of silver to reflect the light produced by the flashlamps 15 and 17 within the glass matrix 13. Surrounding the coating 27 is a sheath 29 of a material of high thermal conductivity such as copper to act as a heat sink for the system to facilitate cooling of the structure.

In operation, the light produced by the flashlamps 15 and 17 irradiates the laser glass of the rod 11 to excite it to a state in which it will amplify light of a particular wavelength which for neodymium-doped glass is 1.06 microns. This process of exciting the laser glass is called "pumping" and the light produced by the flashlamps 15 and 17 is called "pump light." Light of the wavelength which will be amplified by the excited laser glass is referred to as laser light and the wavelength of the laser light is referred to as the laser wavelength. The material of the matrix is preferably lossy to the laser light but is transmissive to the pump light. The material of the matrix for example could be samarium-doped glass.

Because the rod 11 has an oval or elongated cross section with the longer dimension of the cross section running between the flashlamps 15 and 17, more of the light produced by each of the lamps 15 and 17 will excite the laser glass of the rod 11 and less of the light will pass all the way through the rod 11 to be lost in the flashlamps and reflector structure on the opposite side without exciting the laser glass. In addition, the oval cross section of the rod 11 provides an arrangement in which a greater portion of the laser glass forming the rod 11 is near the heat sink 29 and thus improves the cooling of the laser glass.

In the preferred embodiment of the invention, as shown in FIG. 2, the end faces of the rod 11 are inclined at an angle with respect to the symmetry axis of the rod in order to obtain a laser beam having a circular cross section and to prevent reflection from the ends of the rod 11. To avoid any prismatic effect, the end faces of the rod are in parallel planes. By inclining the end faces of the rod 11 at Brewster's angle, reflection of the laser beam at these end surfaces is prevented. A laser ray upon passing through these end faces going out of the rod will be refracted away from normal to the end faces. Accordingly, the laser beam generated in the rod 11 parallel to its axis will be refracted upon passing through the end faces of the rod 11 in a direction indicated by the dashed lines 31. Mirrors 33 and 35 are provided to reflect the laser rays back into the laser rod 11 and define the laser cavity. Because the laser beam is refracted at an angle as illustrated by the dashed lines 31, a laser beam within the rod having an oval cross section corresponding to the oval cross section of the rod 11 will become nearly circular upon being refracted by the end faces of the rod 11. In order to achieve an approximately circular beam, the dimensions of the oval cross section of the rod 11 should be selected so that the width of the oval cross section divided by the length of the cross section is equal to the cosine of the angle through which the beam is refracted at the end face of the rod.

To facilitate manufacturing, the end faces of the matrix 13 and the sheath 29 providing the heat sink are inclined in the same planes as the end faces of the rod 11 as is best shown in FIG. 2. However, the portions 39 and 41 of the end faces of the matrix 13 and sheath 29 are cut in planes inclined in the opposite direction from the axis of the rod from that in which the end faces of the rod 11 are inclined. The electrodes 22 and 23 which are positioned in these end face portions 39 and 41 are bent in angles away from the axis of the rod 11. This structure orients the ends of the electrodes 22 and 23 out of the path of the laser beam.

In operation, when the flash lamps 15 and 17 irradiate the laser glass of the rod 11, the laser glass will emit light of the laser wavelength. When light of this wavelength travels through the excited laser glass, it will induce further emissions which will be in phase with the inducing light. As a result, the light emitted spontaneously by the laser glass will be amplified as it travels through the excited laser glass. Light traveling parallel to the axis of the rod 11 and upon passing through the end faces of the rod 11 will be reflected back by the mirrors 33 and 35 for further amplification in the rod 11. As a result, a standing wave of light energy, referred to as laser oscillations, will be set up between the mirrors 33 and 35. Off axial light will enter the matrix 13 and be suppressed. One of the mirrors 33 and 35 is made partially transmissive to permit some of the energy from the laser oscillations to pass through the mirror to a target. The other mirror is made as near to 100 percent reflective at the laser wavelength as possible.

Figure 3:
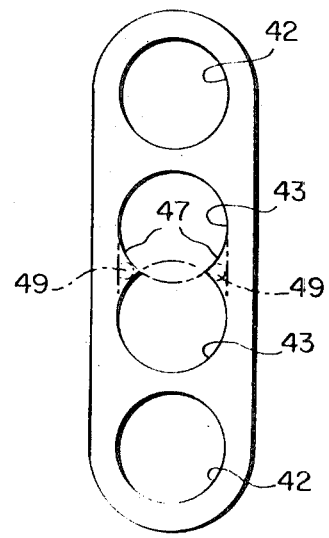

FIG. 3 illustrates an end view of the matrix 13 showing how the matrix is manufactured. As shown in FIG. 3, the cylindrical bores 42 providing the flash lamps 15 and 17 are drilled through each side of the matrix. To form the oval passageway through the matrix, in which the laser rod 11 is mounted, two overlapping cylindrical bores 43 are drilled through the center of the matrix leaving the ridges 47. Small bores 49 are drilled through these ridges and the remainder of the ridges are removed by conventional finishing processes to provide the oval bore through the matrix. The rod 11 is then inserted in the matrix and fused therewith and finally the end faces of the rod 11 and the matrix are cut at the angles as shown in FIG. 2.

Many modifications may be made to the above-described specific embodiment of the invention without departing from the spirit and scope of the invention, which is defined in the appended claims.

I claim:

1. A laser system comprising a rod of laser material and flashlamps positioned on opposite sides of said rod extending along the length of said rod to excite the laser material of said rod, said rod having a cross section elongated in shape oriented so that the longer dimension of said cross section extends between said flashlamps.

2. A laser system as recited in claim 1 wherein said laser material is laser glass.

3. A laser system as recited in claim 1 wherein said rod is oval in cross section.

4. A laser system as recited in claim 3 wherein the end faces of said rod are inclined at angles such that a laser beam generated in said rod parallel to the axis thereof will become circular upon passing through said end faces and being refracted thereby.

5. A laser system as recited in claim 4 wherein said end faces are inclined at Brewster's angle.

6. A laser system as recited in claim 1 wherein said rod and said flashlamps are mounted in a matrix which surrounds said rod and said flashlamps and extends throughout the length of said rod, said matrix being transmissive to the light produced by said flashlamps.

7. A laser system as recited in claim 6 wherein a layer of material of high thermal conductivity surrounds said matrix.

8. A laser system as recited in claim 6 wherein said flashlamps comprise tubular passageways extending through said matrix parallel with said rod and electrodes at each end of said matrix for passing electrical discharge through said passageway to energize said flashlamps.

9. A laser system as recited in claim 8 wherein at least one end fact of said rod is inclined at an angle with respect to the axis of said rod causing the laser beam produced by said rod to refract away from the axis of said rod, a portion of the end face of said matrix corresponding to said one end face of said rod being inclined in the opposite direction from the axis of said rod than said end face of said rod is inclined from said axis, said portion of said end face containing one of said electrodes.

10. A laser system as recited in claim 9 wherein said electrode contained by said portion of said end face of said matrix is bent at an angle with respect to the axis of said rod so as to be out of the path of the laser beam refracted by the inclined end face of said rod.

11. A laser system as recited in claim 1 wherein the end faces of said rod are inclined at angles with respect to the axis of said rod.

12. A laser system as recited in claim 11 wherein said end faces are parallel.

13. A laser system as recited in claim 11 wherein said end faces are inclined at Brewster's angle.

14. A rod of laser material having an oval cross section, the end faces of said rod being inclined at angles so that a laser beam generated in said rod parallel to the axis thereof will become circular upon passing through the end faces and being refracted thereby.